(12) United States Patent
Day (10) Patent No.: US 7,574,528 B2
(45) Date of Patent: Aug. 11, 2009

(54) METHODS AND APPARATUS FOR ACCESSING PRESENCE INFORMATION

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 10/648,999

(22) Filed: Aug. 27, 2003

(65) Prior Publication Data
US 2005/0050157 A1    Mar. 3, 2005

(51) Int. Cl.
G06F 15/16    (2006.01)
(52) U.S. Cl. .................... 709/245; 709/217; 709/231
(58) Field of Classification Search ............... 709/217, 709/231, 245
See application file for complete search history.

(56) References Cited

U.S. PATENT DOCUMENTS

| | | | | |
|---|---|---|---|---|
| 5,892,535 | A | 4/1999 | Allen et al. ..................... | 348/9 |
| 6,122,372 | A * | 9/2000 | Hughes .......................... | 380/2 |
| 6,335,927 | B1 | 1/2002 | Elliot et al. .................. | 370/352 |
| 6,463,471 | B1 * | 10/2002 | Dreke et al. ................. | 709/224 |
| 6,510,513 | B1 * | 1/2003 | Danieli ....................... | 713/156 |
| 6,798,358 | B2 * | 9/2004 | Joyce et al. ............ | 340/995.24 |
| 6,813,501 | B2 * | 11/2004 | Kinnunen et al. ......... | 455/456.2 |
| 6,876,636 | B2 * | 4/2005 | Sinnarajah et al. .......... | 370/312 |
| 6,885,861 | B2 * | 4/2005 | Koskelainen ............. | 455/414.2 |
| 6,910,064 | B1 * | 6/2005 | Astarabadi et al. .......... | 709/203 |
| 2002/0059574 | A1 * | 5/2002 | Tudor et al. .................... | 725/1 |
| 2002/0131395 | A1 * | 9/2002 | Wang .......................... | 370/349 |
| 2002/0147929 | A1 * | 10/2002 | Rose .......................... | 713/201 |
| 2003/0026289 | A1 * | 2/2003 | Mukherjee et al. .......... | 370/466 |
| 2003/0069991 | A1 * | 4/2003 | Brescia ........................ | 709/245 |
| 2003/0083046 | A1 * | 5/2003 | Mathis ........................ | 455/412 |
| 2003/0115283 | A1 * | 6/2003 | Barbir et al. ................. | 709/217 |
| 2003/0217099 | A1 * | 11/2003 | Bobde et al. ................. | 709/202 |
| 2004/0019682 | A1 * | 1/2004 | St. Pierre ..................... | 709/227 |
| 2004/0098491 | A1 * | 5/2004 | Costa-Requena et al. ... | 709/229 |
| 2004/0122901 | A1 * | 6/2004 | Sylvain ....................... | 709/206 |
| 2004/0158608 | A1 * | 8/2004 | Friedman ..................... | 709/206 |
| 2004/0258003 | A1 * | 12/2004 | Kokot et al. ................. | 370/254 |
| 2004/0258046 | A1 * | 12/2004 | Wu et al. ..................... | 370/352 |
| 2005/0010653 | A1 * | 1/2005 | McCanne .................... | 709/219 |

OTHER PUBLICATIONS

A.B. Roach, "Session Initiation Protocol (SIP)-Specific Event Notification", www.ietf.org/rfc/rfc3265.txt, Visited Jul. 14, 2003, pp. 1-36.

* cited by examiner

Primary Examiner—Kenny S Lin
(74) Attorney, Agent, or Firm—Tucker Ellis & West LLP (57) ABSTRACT

A presence server provides presence information to content subscribers via unicast transmission of the presence information. In the case where the presence server receives, from a subscriber, a subscription request for presence information having a relatively large number of subscribers, the presence server directs the content subscriber to a multicast transmission channel. The content subscriber, in turn, accesses the presence information via the multicast transmission channel. By directing content subscribers toward the multicast transmission channel, the presence server conserves connection resources associated with the presence system, thereby allowing the presence system to distribute presence information with a relatively high level of speed and efficiency. Furthermore, by directing content subscribers toward the multicast transmission channel, the presence server minimizes the costs associated with adding new subscribers to the presence system.

29 Claims, 7 Drawing Sheets

METHODS AND APPARATUS FOR ACCESSING PRESENCE INFORMATION

BACKGROUND

A computer network, such as the Internet, allows end users using client computers to access information stored within, or associated with, server computers in the network. In general, content sources (e.g., server devices) on the network transmit requested information as content in the form of a file (e.g., text, audio, or video) or as a stream (e.g., a stored stream or a live stream) involving one-way, point-to-point delivery of a relatively large number of bits to the end users (e.g., client devices). Typically, the content sources transmit the files or streams to the end user or destination using a variety of distribution mechanisms.

One conventional distribution mechanism for content transmission involves one-to-one or point-to-point (e.g., unicast) transmission. In one-to-one transmission, a single content source, such as a server, transmits content to a single receiver, such as a client. In general, one-to-one transmission is an effective transmission mechanism on a small scale because the associated transmission and reception tools, such as client devices, and software have relatively low associated costs. One-to-one transmission is also an effective transmission mechanism because the network connection costs are relatively low.

Certain types of network applications, such as conventional presence systems, provide a client device with content (e.g., presence information) relating to the availability of other users on the network (e.g., whether "online" or "offline") using one-to-one (e.g., unicast) transmission. A conventional presence system, for example, allows users to subscribe to each other (e.g. place each other on a contact list or a buddy list) and receive notification or presence information relating to the availability (e.g., "online" or "offline" status) of the subscribed users within the presence system. Based on receiving notification of a first user's online status, a second user can then decide whether and/or how (e.g., using instant messaging) to make contact with the first user.

A conventional presence system includes a number of users (e.g., content subscribers) in communication with a central site or presence server. When a first user (e.g., content subscriber) wants to receive the presence information associated with a second user, the first user transmits to the presence server a request (e.g., subscription request) for presence information related to the second user. In response, the presence server transmits presence information relating to the presence of the second user on the presence system. Each time that the presence information of the second user changes (e.g., the status of the second user changes from "online" to "offline") the presence system, using the one-to-one transmission mechanism, delivers the changed presence information (e.g., a notification message) to the first user to indicate the change in availability or status of the second user.

SUMMARY

Conventional techniques for providing presence information to a user suffer from a variety of deficiencies. In particular, conventional presence systems lack sufficient methods for distributing presence information to content subscribers.

For example, as described above, a presence server transmits presence information relating to the presence of a user to a content subscriber using a one-to-one (e.g., unicast) transmission. For a single user, the transmission and reception tools associated with the one-to-one transmission have a relatively low associated cost. However, in the case where a relatively large number of content subscribers request presence information from one particular user or presence information source (e.g., the one particular type of presence information is relatively popular) unicast transmission of the presence information can consume connection resources associated with the presence system. For example, the presence server must establish a distinct connection with each user (e.g., where each user has a distinct Internet Protocol address) that has requested to receive the presence information, and transmit the same presence information to each user using the distinct one-to-one connections. Transmission of relatively popular presence information within the presence system using a unicast distribution mechanism, therefore, decreases the relative speed and efficiency of presence information distribution within the presence system.

Furthermore, distribution of relatively popular presence information using a unicast distribution mechanism has an associated relatively high cost for adding new content subscribers to the network. For example, adding new content subscribers to a unicast transmission of presence information requires additional streams of data (e.g., bandwidth) and resources for installing and maintaining the additional streams. The additional streams and resources create additional costs associated with the presence system. Therefore, while unicast distribution of presence information involves a low fixed cost (e.g., cost of computers and connection), such distribution also has an associated high marginal cost (adding content subscribers to receive transmission).

By contrast, embodiments of the present invention significantly overcome such deficiencies and provide mechanisms for providing a content subscriber with access to presence information within the presence system. A presence server provides presence information to content subscribers via unicast transmission of the presence information. In the case where the presence server receives, from a subscriber, a subscription request for presence information having, for example, a relatively large number of subscribers, the presence server directs the content subscriber to a multicast transmission channel. The content subscriber, in turn, accesses the presence information via the multicast transmission channel along with other content subscribers that also have requested to receive that presence information. By directing content subscribers toward the multicast transmission channel for receipt of the presence information, the presence server conserves connection resources associated with the presence system, thereby allowing the presence system to distribute presence information with a relatively high level of speed and efficiency. This is because the presence server only needs to transmit presence information concerning a subscriber onto the multicast transmission channel a single time. Each content subscriber receives a copy of the presence information due to the nature of the multicasting. Furthermore, by directing content subscribers toward the multicast transmission channel, the presence server minimizes the costs associated with adding new subscribers to the presence system.

In one embodiment of the invention, a computerized device, such as a presence server, receives, from a content subscriber, a subscription request for presence information. The computerized device inserts an address (e.g., a multicast address) within a notification message in response to receiving the subscription request. The address relates to presence information transmitted using a one-to-many (e.g., multicast) transmission channel. The computerized device transmits the notification message to the content subscriber. The address of the notification message allows the content subscriber to subscribe to the presence information using the one-to-many transmission channel. By using the address to direct the content subscriber to receive presence information via the one-to-many channel, the computerized device provides efficient utilization of network resources within the presence system. Furthermore, by inserting the address into the notification message, the presence server minimizes the number of messages transmitted through the presence system network and, therefore minimizes network loading.

In one arrangement, the computerized device inserts an address identifier within the notification message, the address identifier indicating the availability of the address within the notification message. The address identifier allows the content subscriber to either utilize or disregard the address within the notification message based upon the content subscriber's ability to recognize the address identifier.

In one arrangement, the computerized device inserts multiple addresses within the notification message. Each of the multiple addresses relates to presence information transmitted using a corresponding one-to-many transmission channel. By transmitting multiple addresses to the content subscriber, the computerized device allows the content subscriber to select a one-to-many transmission channel that is "close" to the content subscriber based upon a selected address and receive presence information from the "close" channel in a relatively fast and efficient manner. By transmitting multiple addresses to the content subscriber, the computerized device also provides support for multiple (e.g., incompatible) multicast protocols utilizable by a variety of independently-implemented content subscribers. For example, assume each address within the notification message includes a corresponding tag indicating a particular communications protocol used for communication with a device located at the address. In such a case, a content subscriber selects an address for communication based upon identification of the tag (e.g., the content subscriber is configured to communicate according to communications protocol identified by the tag).

In one arrangement, the computerized device receives a plurality of subscription requests for presence information from a plurality of content subscribers. The computerized device detects a size characteristic of the plurality of content subscribers and compares the size characteristic to a threshold condition. When the size characteristic of the plurality of content subscribers is greater than the threshold condition, the computerized device transmits the notification message to a portion of the content subscribers, the address of the notification message allowing the portion of the content subscriber to subscribe to the presence information using the one-to-many transmission channel. By directing content subscribers to receive relatively popular (e.g., a relatively large number of content subscribers request presence information from one particular user or presence information source) presence information using the one-to-many transmission channel, the presence server makes efficient use of the network resources within the presence system.

In one arrangement, the computerized device transmits a nullify notification message to a content subscriber subscribed to the presence information using the one-to-many transmission channel, the nullify notification message having a one-to-one address relating to presence information transmitted using a one-to-one transmission channel. The nullify notification message indicates to a content subscriber, in one arrangement, termination of transmission of presence information via the one-to-many transmission channel. In the case where the computerized device detects a decrease in the number of content subscribers subscribing to presence information through the one-to-many transmission channel the computerized device transmits the nullify notification message to direct the content subscriber to receive presence information and, therefore, provide a cost effective use of the one-to-many transmission channels. The computerized device receives a second subscription request from the content subscriber for presence information using the one-to-one transmission channel. Based upon transmission of the second subscription request, the content subscriber receives subsequent notification messages (e.g., presence information) via the one-to-one transmission channel, rather than by the one-to-many channel.

In one arrangement, the computerized device receives an unsubscribe message from the content subscriber in response to transmitting the notification message, the unsubscribe message indicating unsubscription from a one-to-one transmission channel for reception of the presence information and subscription to the one-to-many transmission channel for reception of the presence information. The unsubscribe message allows the computerized device to track the use of network resources (e.g., track the number of content subscribers receiving presence information via a one-to-one transmission channel the presence server versus the number of content subscribers receiving presence information via a one-to-many transmission channel). Based upon such tracking, the computerized device balances distribution of presence information between the one-to-many transmission channel and the one-to-one transmission channel to optimize the speed and efficiency of distribution of presence information within the network.

For example, assume the computerized device receives multiple unsubscribe messages from corresponding multiple content subscribers. As the computerized device receives each unsubscribe message, the computerized device removes each transmitting content subscriber from a content subscriber list or table. Based upon such removal, the computerized device tracks the total number of content subscribers receiving presence information via the one-to-one channel. Assume, based upon the received unsubscribe messages, the computerized device detects the number of content subscribers receiving presence information via the one-to-one channel is less than a threshold condition (e.g., the threshold condition indicating a maximum number content subscribers subscribing to presence information from a particular user device using the one-to-one channel). Further assume that the computerized device detects a relatively large number of content subscribers receiving presence information via the one-to-many channel. In such a case, the computerized device can direct "new" (e.g., future) content subscribers to subscribe to the presence information using the one-to-one transmission channel rather than the one-to-many transmission channel, thereby balancing distribution of presence information between the one-to-many transmission channel and the one-to-one transmission channel Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the device encodes the memory system with a presence information access application that, when performed on the controller, produces a presence information access process that causes the computer system to perform any and/or all of the method embodiments, steps and operations explained herein as embodiments of the invention. Also, a switch, router or other device programmed or otherwise configured to operate as explained herein is an embodiment of the invention.

Other arrangements of embodiments of the invention disclosed herein include software programs to perform the method embodiment steps and operations as summarized above and disclosed in detail below. As an example, a presence information access software control application, such as a data communications device operating system configured to operate as explained herein is an embodiment of the invention. More particularly, a computer program product is disclosed which has a computer-readable medium including computer program logic encoded thereon that, when executed on at least one processor or controller, causes the processor or controller to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other medium such as firmware or micro-code in one or more ROM or RAM or PROM chips or as an Application Specific Integrated Circuit (ASIC). These software or firmware or other such configurations include those installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for distributing content in a networked computer environment, such that the computer program logic, when executed on at least one processing unit with the presence server, causes the at least one processing unit to perform any or all of the aforementioned methods.

In one example embodiment, computer software and/or hardware mechanisms implement the methods embodiments of the invention within a data communications device apparatus. It is to be understood that the system of the invention include those embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide mechanisms for providing a content subscriber with access to presence information within the presence system. A presence server typically provides presence information to content subscribers via unicast transmission of the presence information. In the case where the presence server receives, from a subscriber, a subscription request for presence information having a relatively large number of subscribers, the presence server directs the content subscriber to a multicast transmission channel. The content subscriber, in turn, accesses the presence information via the multicast transmission channel. By directing content subscribers toward the multicast transmission channel, the presence server conserves connection resources associated with the presence system, thereby allowing the presence system to distribute presence information with a relatively high level of speed and efficiency. Furthermore, by directing content subscribers toward the multicast transmission channel, the presence server minimizes the costs associated with adding new subscribers to the presence system.

Figure 1:
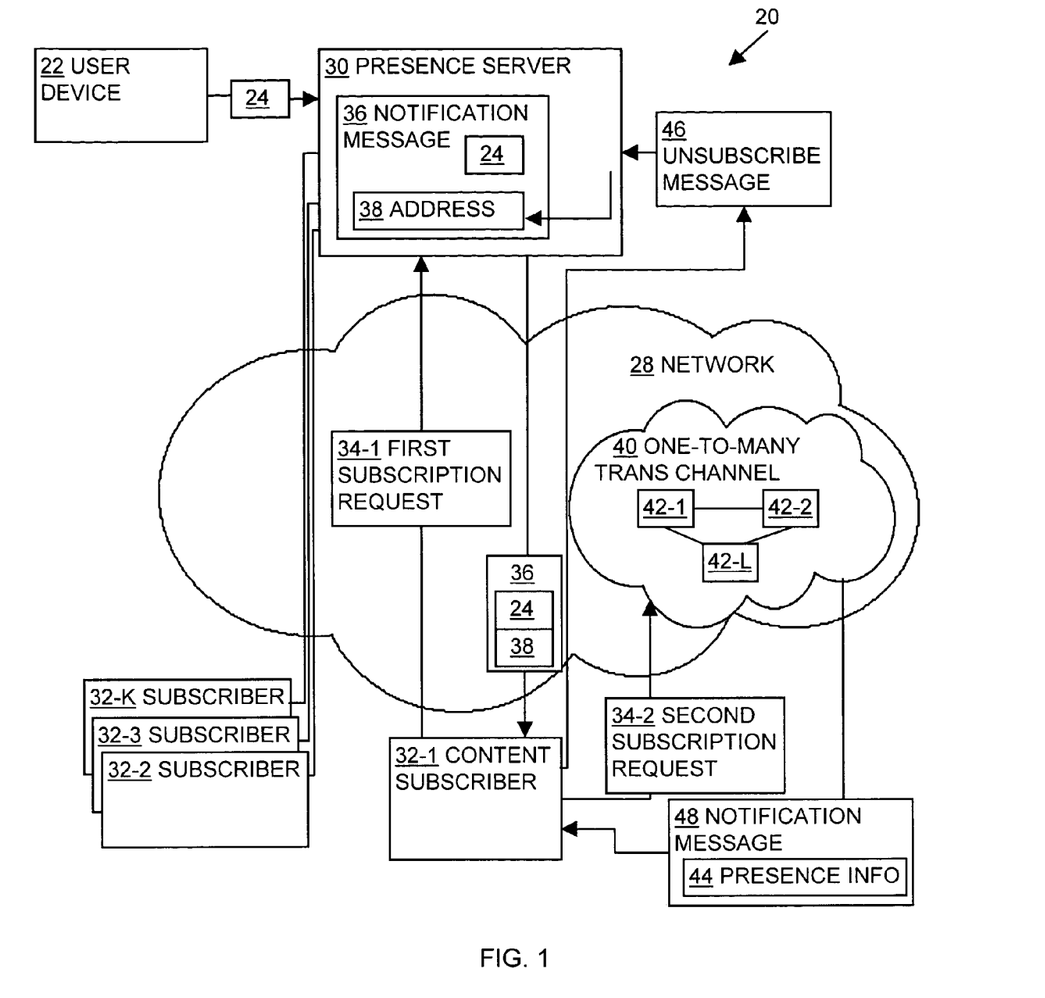
FIG. 1 shows a system for distributing presence information, according to one embodiment of the invention.

FIG. 1 shows a presence system 20, according to one embodiment of the invention. The presence system 20 includes a user device 22, a presence server 30, a network 28, and content subscribers 32-1 through 32-K.

The user device 22, in one arrangement, is a computerized device (e.g., a computer, such as a personal computer) configured to transmit notification or presence information 24 to the presence server 30. In another arrangement, the user device is a sensor, such as a weight sensor (e.g., load cell), motion detector, infrared detector or any sensor that generates a signal in the presence or absence of some stimulus. In another arrangement the user device 22 is a device that aggregates or filters signals (e.g., data) generated by a sensor. The presence information 24, for example, relates to the availability or a change in the availability of the user device 22 within the presence system 20 (e.g., when the status of the user device 22 changes from "offline" to "online").

The presence server 30, in one arrangement, is a computerized device configured to distribute presence information 24, related to the user device 22, to the content subscribers 32. For example, the presence server 30 is configured to transmit notification messages 36 to the content subscribers 32. The notification messages 36 include presence information 24 from the user device 22 and indicate the availability of the user device 22, or a change associated with the availability of the user device 22, within the presence system 20.

The network 28 connects the content subscribers 32 with the presence server 30. The network 28, such as the Internet or a local area network (LAN), includes data communication devices (e.g., routers, switches, etc.) that allow the presence server 30 to provide, to the content subscribers 32, a one-to-one transmission of presence information 24 associated with the user device 22. The one-to-one transmission, such as a unicast transmission, involves transmission of presence information 24 from a single sender (e.g., presence server 30) to a single receiver (e.g., content subscriber 32-1). For example, content subscribers 32-2, 32-2, and 32-K each receive notification messages 36 regarding presence information 24 associated with the user device 22 via unicast transmission. The presence server 30 provides notification messages 36 to the network 28, one for each of the four content subscribers 32-1 through 32-K.

The network 28, in one arrangement, also includes at least one one-to-many transmission channel 40 for one-to-many transmission of presence information 24 associated with the user device 22. The one-to-many transmission, such as a multicast or broadcast transmission, involves transmission of presence information 24 from a single sender (e.g., presence server 30) to multiple receivers. The multicast channel 40, therefore, is configured to transmit presence information associated with the user device 22 to multiple content subscribers 32.

Figure 2:
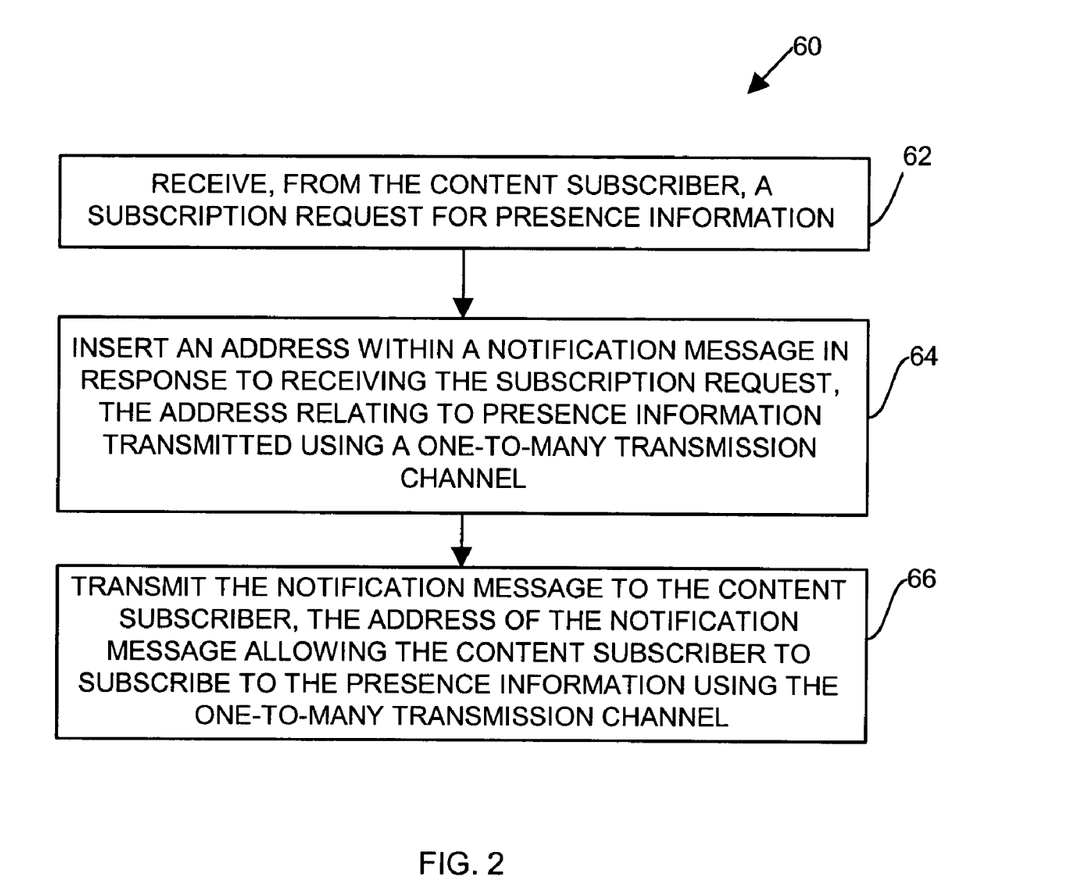
FIG. 2 illustrates a flow chart of a procedure performed by the system of FIG. 1, according to one embodiment of the invention.

FIG. 2 illustrates a flowchart showing a method 60 performed by the presence server 30 of the presence system 20 of FIG. 1, according to one embodiment of the invention. In the method 60, the presence server 30 allows a content subscriber 32-1 to access presence information 24 associated with the user device 22 via the multicast channel 40 within the network 28. For example, in the case where the presence information 24 for the user device 22 is relatively popular presence information 24 (e.g., having a large number of requests or subscribers), the presence server 30 directs a content subscriber 32-1 to receive presence information 24 from the user device 22 via the one-to-many or multicast transmission channel 40 rather than a one-to-one or unicast transmission channel.

In step 62, the presence server 30 receives, from the content subscriber 32-1, a subscription request 34 (e.g., a first subscription request 34-1) for presence information 24. For example, when the content subscriber 32-1 wants to receive presence information 24 associated with the user device 22, the content subscriber 32-1 transmits a subscription request 34, such as a SUBSCRIBE message to the presence server 30. In one arrangement, the subscription request 34 includes a request for the current (e.g., most recent) presence information 24 for the user device 22. In another arrangement, the subscription request 24 includes a request for notification for a change in the presence information 24 of the user device 22 (e.g., updated presence information 24). In yet another arrangement, the subscription request 24 includes a request for both the current value of the presence information 24 and for changes in presence information 24 of the user device 22.

In one arrangement, the presence server 30 maintains information related to the subscription request 34 within a content subscriber list or table to track additions or deletions of content subscribers 32 subscribed to a particular user device 22. For example, in one arrangement, after the presence server 30 receives a subscription request 34 from the content subscriber 32-1 for subscription to presence information 24 associated with the user device 22, the presence server 30 tracks presence information 24 related to the user device 22 to which the content subscriber 32-1 subscribed. When the presence server 30 receives presence information 24 from the user device 22, the presence server 30 reviews the list or table to detect the content subscribers 32 that subscribe to the presence information 24 of the user device 22. The presence server 30 then transmits a notification message 36, to the content subscribers 32 subscribed to the presence information 24 of the user device 22. The notification message 36, in one arrangement, includes the presence information 24 from the user device 22, indicating availability of the user device 22, or a change associated with the availability of the user device 22, within the presence system 20.

In step 64, the presence server 30 inserts an address 38 within a notification message 36 in response to receiving the subscription request 34 where the address 38 relates to presence information 24 transmitted using a one-to-many transmission channel 40. For example, assume the presence server 30 receives presence information 24 from the user device 22 and detects that the content subscriber 32-1 subscribes to the presence information 24 from the user device 22. In the case where the presence information 24 is relatively popular, the presence server 30 inserts the address 38 within the notification message 36 where the address relates to the one-to-many transmission channel 40. For example, the address 38 included within the notification message 36 is the address, such as an Internet Protocol (IP) address of a multicast-enabled data communication device 42 within the one-to-many transmission channel 40. By inserting the address 38 related to the one-to-many transmission channel 40 into the notification message 36, the presence server 30 "piggybacks" the address 38 on the outgoing notification message 36, thereby minimizing the generation and transmission of a separate message over the network 28 containing the address 38 relating to the one-to-many transmission channel 40. By inserting the address 38 into the notification message 36, the presence server 30 minimizes the number of messages transmitted through the network 28 (e.g., the presence server 30 does not flood the network 28 with unnecessary messages) and minimizes network loading.

In step 66, the presence server 30 transmits the notification message 36 to the content subscriber 32-1, the address 38 of the notification message 36 allowing the content subscriber 32-1 to subscribe to the presence information 24 using the one-to-many transmission channel 40. As indicated above, the network 28 of the presence system 20 transmits presence information 24 to content subscribers utilizing a one-to-one (e.g., unicast) transmission mechanism. To provide more efficient utilization of network resources within the presence system 20 the presence server 30 transmits, to the content subscriber 32-1, the address 38 within the notification message 36 (e.g., the notification message 36 carries or contains the address 38 relating to the one-to-many transmission channel 40) to direct the content server 32-1 to the one-to-many transmission channel 40.

By using the address 38 to direct the content subscriber 32-1 to receive presence information 24 via the one-to-many channel 40, the presence server 30 provides efficient utilization of network resources within the presence system 20. For example, the presence server 30 typically transmits notification messages 36 (e.g., having the subscribed presence information 24) over the network 28 to the content subscribers 32 using a one-to-one or unicast transmission channel. In the case where the presence information 24 for the user device 22 is relatively popular presence information 24 (e.g., large number of requests or subscribers), by transmitting the notification messages 36 to the content subscribers 32 using the one-to-one transmission channel, the presence server 30 can over-utilize the network resources (e.g., overload the network 28 or the presence server 30). Such over-utilization, in turn, decreases the speed or efficiency at which the network 28 delivers the notification messages 36 to the content subscribers, for example. By contrast, when the presence server 30 directs the content subscriber 32-1 to receive relatively popular presence information 24 of the user device 22 via a one-to-many or multicast transmission channel 40, the presence server 30 conserves connection resources associated with the network 28 of the presence system 20, thereby allowing the network 28 to distribute presence information 24 to content subscribers 32 with a relatively high level of speed and efficiency and in a relatively economical manner (e.g., at no additional cost per added content subscriber 32).

Once the content subscriber 32-1 receives the notification message 36 having the address 38, the content subscriber 32-1 transmits a second subscription request 34-2 for presence information 24 using the one-to-many transmission channel 40. For example, the content subscriber 32-1 transmits the second subscription request 34-2 to a data communications device 42 within the one-to-many transmission channel 40 where the data communications device 42 has the address corresponding to the address 38 received with the notification message 36. Based upon transmission of the second subscription request 34-2, the content subscriber 32-1 receives notification messages 36 having subsequent presence information 24 associated with the user device 22 via the one-to-many transmission channel 40.

In one arrangement, after the content subscriber 32-1 receives the notification message 36 and subscribes to presence information 24 associated with the user device 22 using the one-to many transmission channel 40, the content subscriber 32-1 transmits an unsubscribe message 46 to the presence server 30. When the presence server receives the unsubscribe message 46 the presence server continues to provide the presence information 24 (in the form of notification messages 36) to content subscribers 32, via the network 28. The unsubscribe message 46 indicates, to the presence server 30, unsubscription, by the content subscriber 32-1, from a one-to-one transmission channel for reception of the presence information 24 and subscription to the one-to-many transmission channel 40 for reception of the presence information 24.

In one arrangement, the presence server 30 utilizes the unsubscribe message 46 to track both the number of content subscribers 32 receiving presence information 24 of the user device 22 using the one-to-many transmission channel 30 and the number of content subscribers 32 receiving presence information 24 of the user device 22 using the one-to-one transmission channel. Based upon such tracking, the presence server 30 balances distribution of presence information 24 between the one-to-many transmission channel 30 and the one-to-one transmission channel to optimize the speed and efficiency of distribution of presence information 24 within the network 28.

As described above, the presence server 30 inserts an address 38 within the notification message 36 and transmits the notification message 36 to the content subscriber 32-1. In one arrangement, the presence server 30 also includes an address identification element within the notification message 36 that allows the content subscriber 32-1 to identify the presence of the address 38 within the notification message 36.

Figure 3:
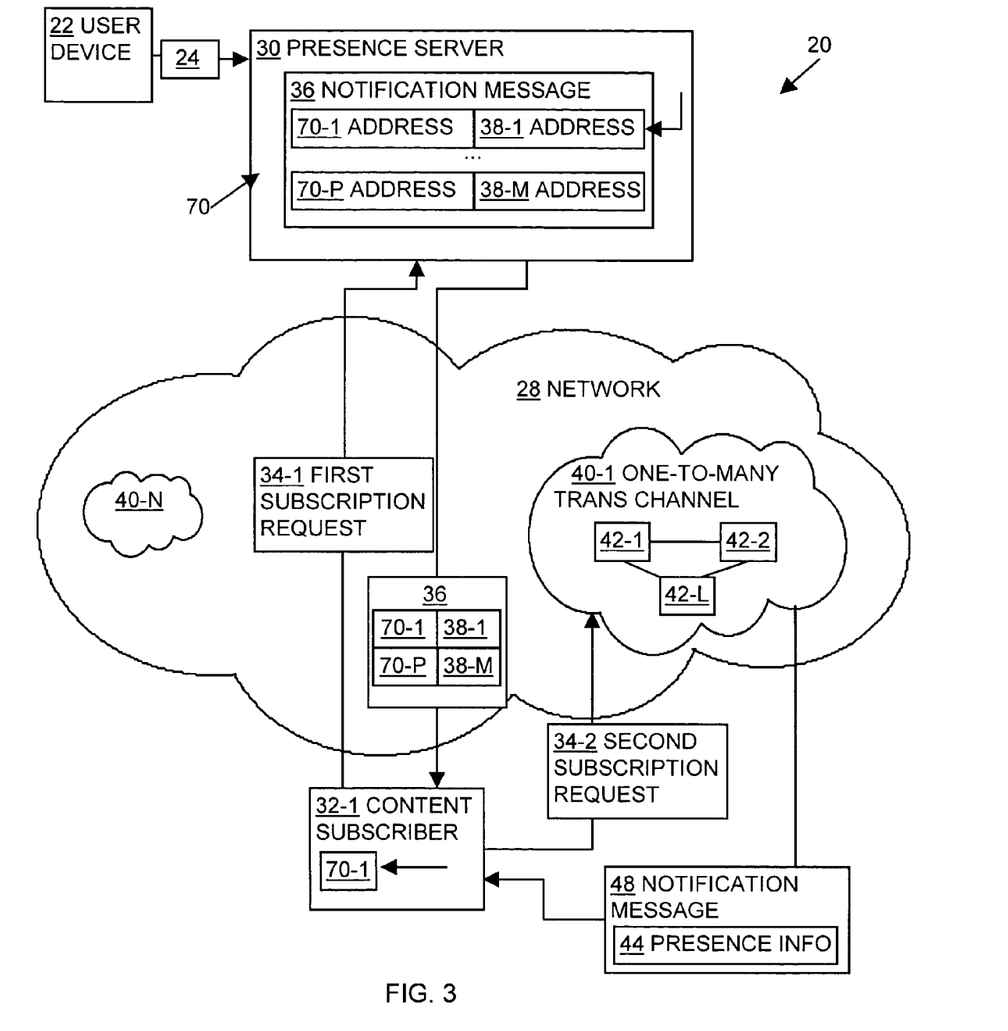
FIG. 3 illustrates the system of FIG. 1, according to one embodiment of the invention.

FIG. 3 illustrates an arrangement of the presence system 20 where the presence server 30 inserts an address identifier 70 within the notification message 36. The address identifier 70 indicates to the content subscriber 32-1 the availability of the address 38 within the notification message 36. For example, the address identifier 70, in one arrangement, is a tag associated with an Extensible Markup Language (XML)-based format, such as the Presence Information Data Format. Insertion of the address identifier 70 within the notification message 36, therefore, allows the content subscriber 32-1 to either utilize or disregard the address 38 within the notification message 36 based upon the content subscriber's 32-1 ability to recognize the tag or address identifier 70.

For example, assume the content subscriber 32-1 receives the notification message 36 having the address identifier 70 and examines the address identifier 70. In the case where the content subscriber 32-1 recognizes or identifies the address identifier 70, the content subscriber 32-1 utilizes the address 38 to transmit the second subscription request 34-2 for presence information 24 using the one-to-many transmission channel 40. In the case where the content subscriber 32-1 does not recognize or identify the address identifier 70, the content subscriber 32-1 disregards the address. In one arrangement, by disregarding the address 38, the content subscriber 32-1 maintains the subscription for presence information 24 with the user device 22 and receives updates as to the presence information 24 from the user device via one-to-one (e.g., unicast) transmission of notification messages 36 through the network 28.

In one arrangement, also as illustrated in FIG. 3, the presence server 30 inserts a plurality of addresses 38-1, 38-M within the notification message 36. Each of the plurality of addresses 38-1, 38-M relates to presence information 24 transmitted using a corresponding one-to-many transmission channel 40-1, 40-N, respectively. By transmitting multiple addresses 38-1, 38-M to the content subscriber 32-1, the presence server 30 allows the content subscriber 32-1 to select a one-to-many transmission channel 40 that is "close" to the content subscriber 32-1, based upon a selected address 38-1, 38-M, and receive presence information 24 from the "close" channel in a relatively fast manner.

For example, assume the content subscriber 32-1 receives the notification message 36 having multiple addresses 38-1, 38-M. The content subscriber 32-1 then selects one of the addresses 38-1, 38-M associated with a corresponding one-to-many transmission channel for reception of the presence information 24. In one arrangement, the content subscriber 32-1 selects an address 38 based upon the relative geographic proximity of the content subscriber 32-1 to each one-to-many channel 40-1, 40-N associated with the address to the content subscriber 32-1. For example, assume the content subscriber 32-1 is located of the East Coast, the first address 38-1 indicates the first one-to-many transmission channel 40-1 includes data communications devices 42 located on the East Coast, and the second address 38-2 indicates the second one-to-many transmission channel 40-N includes data communications devices 42 located on the West Coast. Based upon the geographic proximity of the content subscriber 32-1 and the first one-to-many transmission channel 40-1, the content subscriber 32-1 selects the first one-to-many transmission channel 40-1 over which to receive presence information 24 associated with the user device 22.

In another arrangement, by transmitting multiple addresses 38-1, 38-M to the content subscriber 32-1, the presence server 30 also provides support for multiple (e.g., incompatible) multicast protocols utilizable by a variety of independently-implemented content subscribers. For example, assume each address 38 within the notification message 36 includes a corresponding tag indicating a particular communications protocol used for communication with a device located at the address 38 (the device associated with a particular channel 40). In such a case, a content subscriber 32-1 selects an address 38 for communication based upon identification of the tag (e.g., the content subscriber 32-1 is configured to communicate according to communications protocol identified by the tag).

As indicated above, the presence server 30 transmits notification messages 36 to content subscribers 32 using a one-to-one transmission channel within the network 28. As the number of content subscribers 32 for presence information 24 of the user device 22 increases, one-to-one transmission of notification messages 36 over the network 28 consumes an increasing amount of network resources and slows transmission of the notification messages 36 to the content subscribers 32. After detecting a relatively large number of content subscribers 32 requesting the presence information 24 (e.g., the presence information 24 being relatively popular), in order to conserve connection resources associated with the presence system 20, the presence server 30 transmits, to content subscribers 32, a notification message 36 having the address 38. The address 38 directs the content subscribers 32 to receive presence information 24 using a one-to-many transmission channel 40. In such a case, by directing content subscribers 32 to receive relatively popular presence information 24 using the one-to-many transmission channel 40, the presence server 30 makes efficient use of the network resources within the presence system 20.

Figure 4:
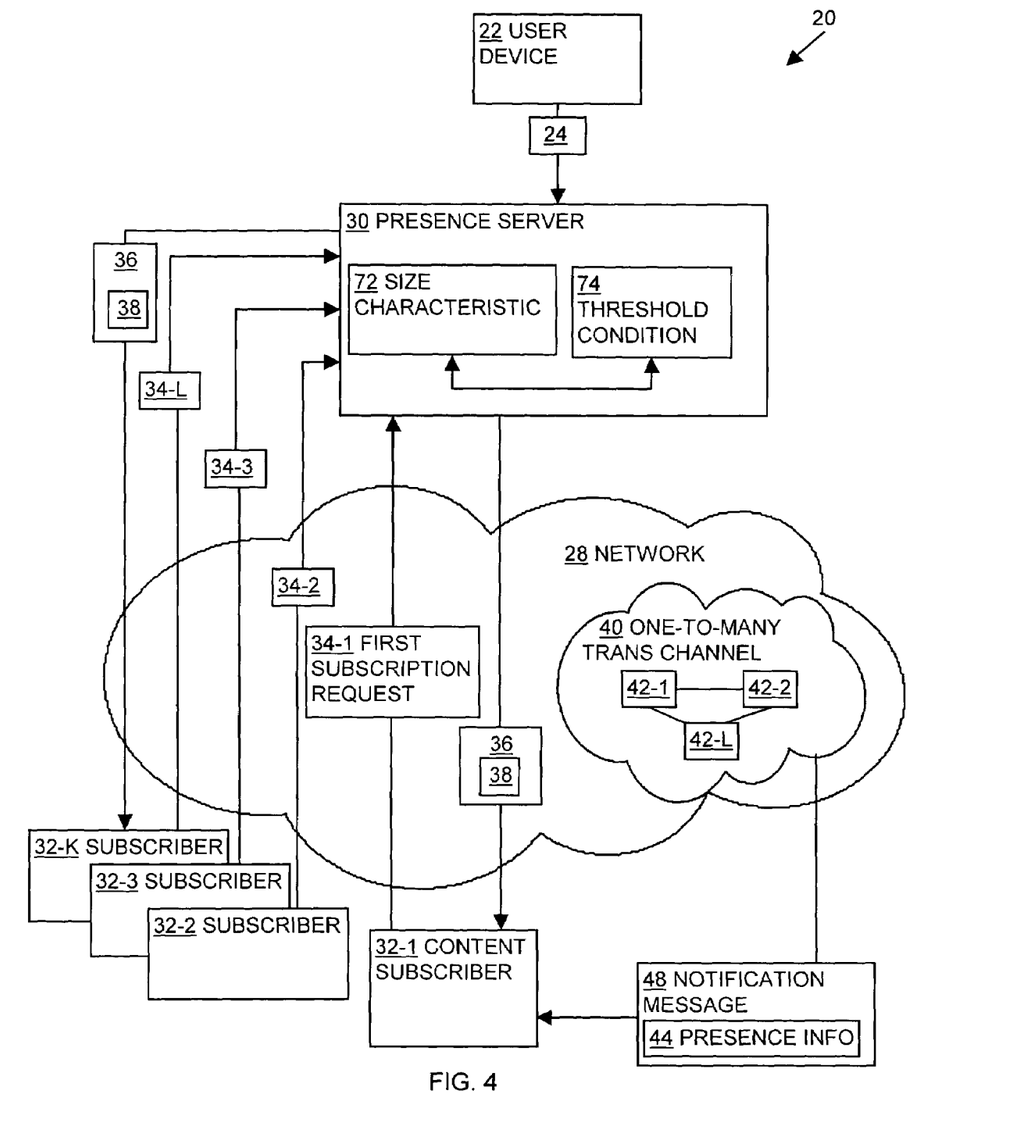
FIG. 4 shows the system of FIG. 1, according to one embodiment of the invention.

FIG. 4 illustrates an arrangement of the presence system 20 where the presence server 30 transmits the notification message 36, having the address 38, based upon the relative popularity of the presence information 24 of the user device 22. The presence server 30 detects the relative popularity of presence information 24 of a user device 22 based upon a comparison between the number of content subscribers 32 that subscribe to the presence information 24 and a threshold level or condition 74.

For example, as shown in FIG. 4, the presence server 30 receives multiple subscription requests 34-1 through 34-K for presence information 24 associated with the user device 22. Each subscription requests 34-1 through 34-K is associated with a corresponding content subscriber 32-1 through 32-K, respectively. As indicated above, the presence server 30 maintains information related to the subscription request 34 within a content subscriber table or list to track additions or deletions of content subscribers 32 subscribed to a particular user device 22. To detect the size characteristic 72 associated with the content subscribers 32, for example, the presence server 30 counts the number of content subscribers 32, within the table, that subscribe to presence information 24 from a particular user device 22.

In order to gauge the relative popularity of the presence information 24 of the user device 22, the presence server 30 compares the size characteristic 72 to the threshold condition 74. The threshold condition 74, in one arrangement, indicates an acceptable level of popularity for the presence information 24. For example, assume that the threshold condition 74 indicates presence information 24 from a particular user device 22 has a limit of 1000 content subscribers 32. When the size characteristic 72 of the content subscribers 32, for example 500 content subscribers 32, is less than or equal to the threshold condition 74 (e.g., the presence information 24 is relatively unpopular), the content subscribers 32 continue to receive presence information 24 of the user device via a one-to-one transmission channel over the network 28. When the size characteristic 72 of the content subscribers 32, for example 1500 content subscribers 32, is greater than the threshold condition 74 (e.g., the presence information 24 is relatively popular), the presence server 30 transmits the notification message 36, having the address 38, to the content subscribers 32. The address 38 of the notification message 36 allows the content subscribers 32 to subscribe to the presence information 24 using the one-to-many transmission channel 40 and, therefore receive presence information in a relatively fast and efficient manner.

In one arrangement, when the presence server 30 detects the size characteristic 72 is greater than the threshold condition 74, the presence server transmits the notification message 36 having the address 38 to a portion of the content subscribers 32. For example, as shown in FIG. 4, content subscribers 32-1, 32-2, 32-3, and 32-K transmit subscription requests 34-1, 34-2, 34-3, 34-L, respectively, to the presence server 30. After the presence server 30 detects that the size characteristic 72 for the content subscribers is greater that the threshold condition, the presence server transmits the notification message 36 having the address 38 to content subscriber 32-1 and content subscriber 32-K. By directing only a portion of the content subscribers 32-1, 32-K toward the one-to-many transmission channel 40, the presence server 30 limits the number of content subscribers 32 transmitting, within the network 28, second subscription requests 34-2 toward the one-to-many transmission channel 40 and unsubscribe messages 46 to the presence server 30. By limiting the number of second subscription requests 34-2 and unsubscribe messages 46 within the network 28, the presence server 30 minimizes network loading and maintains efficient use of network resources within the presence system 20.

The one-to-many transmission channel 40 provides efficient transmission of presence information 24 to a relatively large number of content requesters 32 using the network resources within the presence system 20. In certain cases, the number of content subscribers 32 subscribing to presence information 24 from a particular user device 22, through the one-to-many transmission channel 40, decreases. Transmission of presence information 24 to a relatively small number of content subscribers 32 within the presence system 20 using a one-to-many transmission channel 40, however, does not provide a cost effective use of the one-to-many transmission channels 40.

Figure 5:
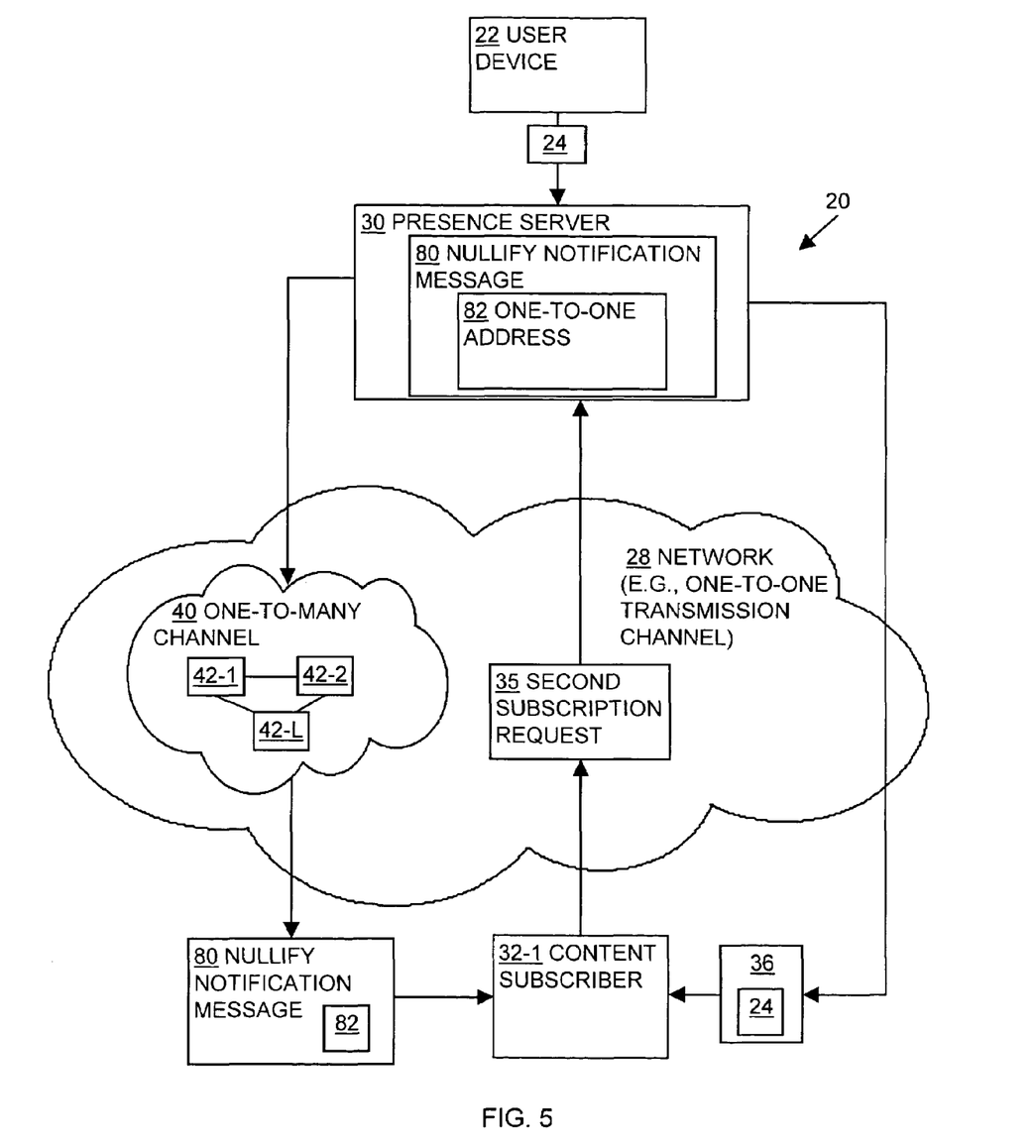
FIG. 5 illustrates the system of FIG. 1, according to one embodiment of the invention.

FIG. 5 illustrates the presence server 30 directing the content subscriber 32-1 to terminate reception of presence information 24, associated with the user device 22, by way of the one-to-many transmission channel 40 and, instead, receive presence information 24 using a one-to-one transmission (e.g., unicast) channel within the network 28.

In one arrangement, assume the presence server 30 detects that a relatively small number of content subscribers 32 receive presence information 24 of the user device 22 via the one-to-many transmission channel 40 (e.g., the presence information 24 of the user device 22 is relatively unpopular). The presence server 30 transmits a nullify notification message 80 to the content subscriber 32-1 subscribed to the presence information 24 using the one-to-many transmission channel 40. In one arrangement, the presence server 30 generates and transmits the nullify notification message 80 to the corresponding content subscriber 32-1 in response to receiving presence information 24 from the user device 22. The nullify notification message 80 indicates to the content subscriber 32-1, in one arrangement, termination of transmission of presence information 24 via the one-to-many transmission channel 40.

The nullify notification message 80 has a one-to-one address 82 relating to presence information 24 transmitted using a one-to-one transmission channel 28. For example, the one-to-one address 82 corresponds to an IP address of a data communications device, within the network 28, configured to provide a one-to-one (e.g., unicast) transmission of content or presence information 24 to the content subscriber. When the content subscriber 32-1 receives the one-to-one address 82 from the nullify notification message 80, the content subscriber 30 transmits a second subscription request 35 to the presence server 30, via the one-to-one transmission channel 28. Based upon transmission of the second subscription request 35, the content subscriber 32-1 receives subsequent notification messages (e.g., presence information 24) from the presence server 30 via the one-to-one transmission channel 28, rather than by the one-to-many channel 40.

Figure 6:
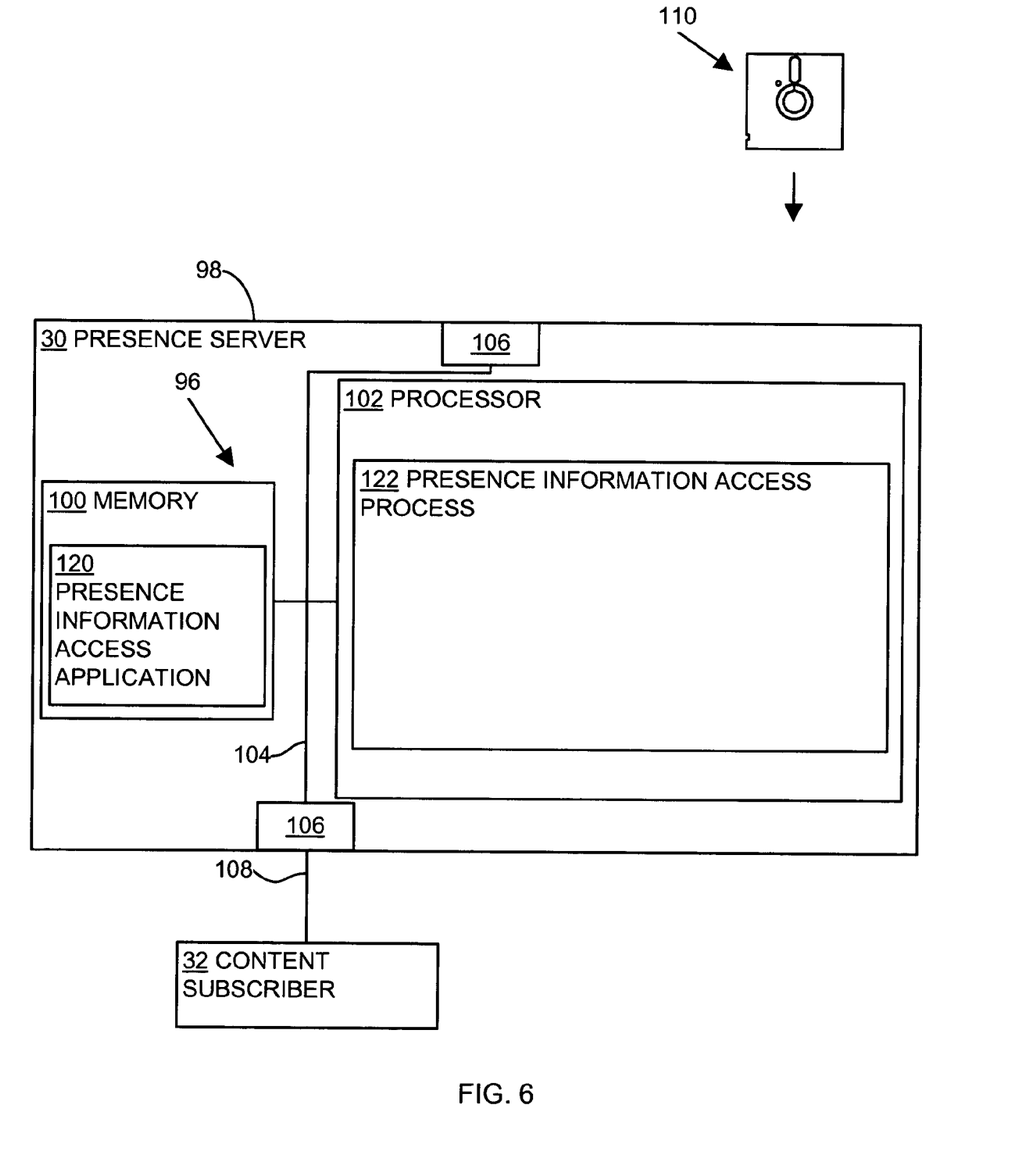
FIG. 6 depicts a computer implementation of a presence server, according to one embodiment of the invention.

FIG. 6 illustrates a more detailed architecture of a presence server 30 configured according to one embodiment of the invention. FIG. 6 shows a computer device 98, configured to run as a presence server 30, in one embodiment of the invention. A computer program product 110 includes an application or logic instructions that are loaded into the computer device 98 to configure the device 98 to perform as a presence server 30.

The presence server 30, in this example embodiment of the invention, includes an interconnection mechanism 104 such as a data bus and/or other circuitry that interconnects a controller 96, having a memory 100 and a processor 102, and one or more communications interfaces 106.

The memory 100 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 100 is encoded with logic instructions (e.g., software code) and/or data that form a presence information access application 120 configured according to embodiments of the invention. In other words, presence information access application 120 represents software code, instructions and/or data that represent or convey the processing logic steps and operations as explained herein and that reside within memory or storage or within any computer readable medium accessible to the presence server 30.

The processor 102 represents any type of circuitry or processing device such as a central processing unit, microprocessor or application-specific integrated circuit that can access the presence information access application 120 encoded within the memory 100 over the interconnection mechanism 104 in order to execute, run, interpret, operate or otherwise perform the presence information access application 120 logic instructions. Doing so forms presence information access process 122. In other words, the presence information access process 122 represents one or more portions of the logic instructions of the presence information access application 120 while being executed or otherwise performed on, by, or in the processor 102 within the presence server 30. The presence server 30 in FIG. 1 collectively represents either one or both of the presence information access application 120 and the presence information access process 122.

Figure 7:
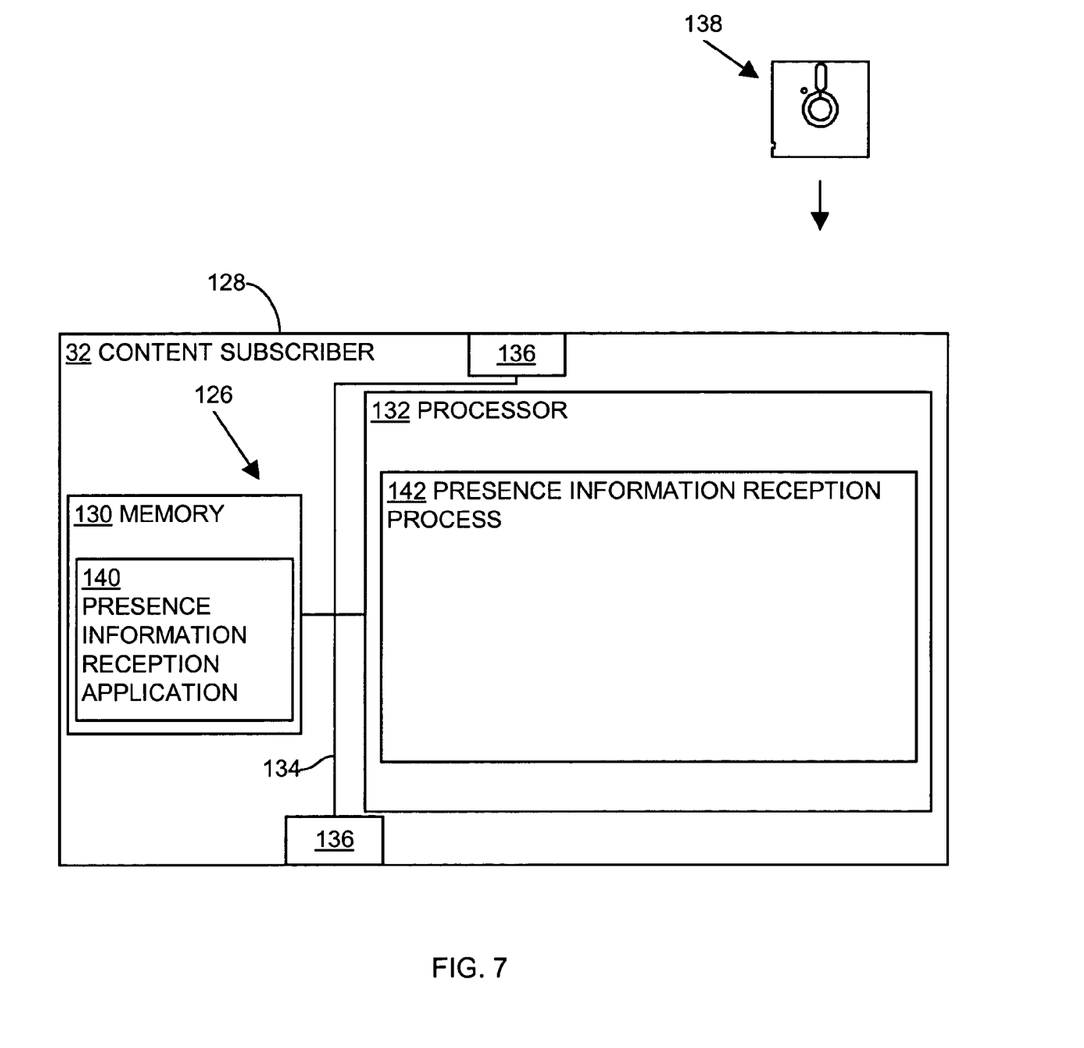
FIG. 7 depicts a computer implementation of a content subscriber, according to one embodiment of the invention.

FIG. 7 illustrates a more detailed architecture of a content subscriber 32 configured according to one embodiment of the invention. FIG. 7 shows a computer device 128, configured to run as a content subscriber 32, in one embodiment of the invention. A computer program product 138 includes an application or logic instructions that are loaded into the computer device 128 to configure the device 128 to perform as a content subscriber 32.

The content subscriber 32, in this example embodiment of the invention, includes an interconnection mechanism 134 such as a data bus and/or other circuitry that interconnects a controller 126, having a memory 130 and a processor 132, and one or more communications interfaces 136.

The memory 130 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 130 is encoded with logic instructions (e.g., software code) and/or data that form a presence information reception application 140 configured according to embodiments of the invention. In other words, presence information reception application 140 represents software code, instructions and/or data that represent or convey the processing logic steps and operations as explained herein and that reside within memory or storage or within any computer readable medium accessible to the content subscriber 32.

The processor 132 represents any type of circuitry or processing device such as a central processing unit, microprocessor or application-specific integrated circuit that can access the presence information reception application 140 encoded within the memory 130 over the interconnection mechanism 134 in order to execute, run, interpret, operate or otherwise perform the presence information reception application 140 logic instructions. Doing so forms presence information reception process 142. In other words, the presence information reception process 142 represents one or more portions of the logic instructions of the presence information reception application 140 while being executed or otherwise performed on, by, or in the processor 132 within the content subscriber 32. The content subscriber 32 in FIG. 1 collectively represents either one or both of the presence information reception application 140 and the presence information reception process 142.

Those skilled in the art will understand that there can be many variations made to the embodiments explained above while still achieving the same objective of those embodiments and the invention in general.

As described above, FIG. 3 illustrates an arrangement of the presence system 20 where the presence server 30 inserts an address identifier 70 within the notification message 36. The address identifier 70 indicates to the content subscriber 32-1 the availability of an address 38 within the notification message 36. Such a description is by way of example only. In one arrangement, presence server 30 associates a single address identifier 70 with multiple addresses 38-1, 38-M. When the content subscriber 32-1 detects the presence of the single address identifier 70 indicating the availability or presence of multiple addresses 38-1, 38-M, the content subscriber 32-1 selects an address 38-1, 38-M from the multiple addresses and accesses the one-to-many transmission channel 40 using the selected address. In another arrangement, presence server 30 associates multiple address identifiers 70-1, 70-P with multiple addresses 38-1, 38-M such that each address identifier 70-1, 70-P corresponds with a respective address 38-1, 38-M. The content subscriber 32-1 then identifies one or more of the multiple address identifiers 70-1, 70-P and selects an address 38-1, 38-M to access the one-to-many transmission channel 40.

As described above, once the content subscriber 32-1 receives the notification message 36 having the address 38, the content subscriber 32-1 transmits a second subscription request 34-2 for presence information 24 using the one-to-many transmission channel 40. Such a description is by way of example only. In one arrangement, after the content subscriber 32-1 receives the notification message 36 having the address 38 and identifies the address 38, the content subscriber 32-1 disregards the address 38 within the notification message 36 and continues to receive notification messages 36 (e.g., presence information 24) from the presence server 30 via the one-to-one transmission channel (e.g., network 28) of the presence system 20.

As described above, the presence server 30 inserts an address 38 within a notification message 36 and transmits the notification message 36 to the content subscriber 32-1. In one arrangement, the presence server 30 generates the notification message 36 in response to receiving updated presence information 24 from the user device 22. In another arrangement, the presence server 30 generates the notification message 36 in an asynchronous manner (e.g., not in response to receiving updated presence information 24). For example, the presence server 30 generates the notification message 36 in response to detecting the size characteristic 72 of the content subscribers 32 is greater than a threshold condition 74.

Such variations are intended to be covered by the scope of this invention. As such, the foregoing description of embodiments of the invention is not intended to be limiting. Rather, any limitations to the invention are presented in the following claims.

What is claimed is:

1. In a system for distributing presence information, a method for allowing a content subscriber to access the presence information comprising:
   receiving from the content subscriber on a one-to-one transmission channel, a subscription request for presence information;
   inserting an address within a notification message in response to receiving the subscription request, the address within the notification message directing the content subscriber to a one-to-many transmission channel to receive the presence information transmitted using the one-to-many transmission channel;
   inserting an address identifier within the notification message, the address identifier indicating an availability of the address within the notification message;
   transmitting the notification message to the content subscriber using the one-to-one transmission channel, the address of the notification message allowing the content subscriber to subscribe to the presence information using the one-to-many transmission channel;
   determining, by the content subscriber, a recognition of the address identifier; and,
   in accordance with a recognition of the address identifier within the notification message, subscribing to the presence information using the one-to-many transmission channel resulting in the content subscriber receiving the presence information from a presence server of the system by the one-to-many transmission channel.

2. The method of claim 1 wherein the step of inserting comprises inserting a plurality of addresses within the notification message, each of the plurality of addresses relating to presence information transmitted using a corresponding one-to-many transmission channel.

3. The method of claim 1 wherein the receiving comprises receiving a plurality of subscription requests for presence information from a plurality of content subscribers and further comprising:
   detecting a size characteristic of the plurality of content subscribers;
   comparing the size characteristic to a threshold condition; and
   when the size characteristic of the plurality of content subscribers is greater than the threshold condition, the step of transmitting comprises transmitting the notification message to a portion of the content subscribers, the address of the notification message allowing the portion of the content subscribers to subscribe to the presence information using the one-to-many transmission channel.

4. The method of claim 3 further comprising:
   transmitting a nullify notification message to a content subscriber subscribed to the presence information using the one-to-many transmission channel, the nullify notification message having a one-to-one address relating to presence information transmitted using a one-to-one transmission channel; and
   receiving a second subscription request from the content subscriber for presence information using the one-to-one transmission channel.

5. The method of claim 1 further comprising receiving an unsubscribe message from the content subscriber in response to transmitting the notification message, the unsubscribe message indicating unsubscription from a one-to-one transmission channel for reception of the presence information and subscription to the one-to-many transmission channel for reception of the presence information.

6. The method of claim 5 comprising:
   tracking the number of content subscribers using one-to-one transmission channel and the number of content subscribers using one-to-many transmission channel based on the number of unsubscribe messages received; and
   balancing distribution of presence information between the one-to-one transmission channel and the one-to-many transmission channel based on the number of content subscribers using each channel.

7. The method of claim 1 wherein:
   the inserting comprises inserting the address within the notification message in response to receiving the subscription request, the address relating to presence information transmitted using a multicast transmission channel; and
   the transmitting comprises transmitting the notification message to the content subscriber, the address of the notification message allowing the content subscriber to subscribe to the presence information using the multicast transmission channel.

8. The method of claim 1 wherein each address within the notification message includes a tag indicating a particular communications protocol and wherein the content subscriber is configured to communicate according to the communications protocol identified by said tag such that multiple protocols are utilizable by a plurality of independently-implemented content subscribers.

9. A computerized device comprising:
   at least one communications interface;
   a controller; and
   an interconnection mechanism coupling the at least one communications interface and the controller;
   wherein the controller is configured to:
      receive from an associated content subscriber on a one-to-one transmission channel, a subscription request for the presence information;
      insert an address within a notification message in response to receiving the subscription request, the address within the notification message directing the associated content subscriber to a one-to-many transmission channel to receive the presence information transmitted using the one-to many transmission channel;
      insert an address identifier within the notification message in response to receiving the subscription request, the address identifier indicating the availability of the address within the notification message;
      transmit the notification message to the associated content subscriber using the one-to-one transmission channel, the address of the notification message allowing the associated content subscriber to subscribe to the presence information using the one-to-many many transmission channel and allowing the associated content subscriber to determine a recognition of the address identifier; and,
      subscribe, in accordance with the notification message, to a delivery of the presence information using the one-to-many transmission channel resulting in the associated content subscriber receiving the presence information from the computerized device by the one-to-many transmission channel.

10. The computerized device of claim 9 wherein the controller, when inserting, is configured to insert a plurality of addresses within the notification message, each of the plurality of addresses relating to presence information transmitted using a corresponding one-to-many transmission channel.

11. The computerized device of claim 9 wherein the controller, when receiving, is configured to receive, via the at least one communications interface, a plurality of subscription requests for presence information from a plurality of associated content subscribers and wherein the controller is further configured to:
  detect a size characteristic of the plurality of content subscribers;
  compare the size characteristic to a threshold condition; and
  when the size characteristic of the plurality of associated content subscribers is greater than the threshold condition, the controller, when transmitting, is configured to transmit, via the at least one communications interface, the notification message to a portion of the associated content subscribers, the address of the notification message allowing the portion of the associated content subscribers to subscribe to the presence information using the one-to-many transmission channel.

12. The computerized device of claim 11 wherein the controller is further configured to:
  transmit, via the at least one communications interface, a nullify notification message to an associated content subscriber subscribed to the presence information using the one-to-many transmission channel the nullify notification message having a one-to-one address relating to the presence information transmitted using a one-to-one transmission channel; and
  receive, via the at least one communications interface, a second subscription request from the associated content subscriber for presence information using the one-to-one transmission channel.

13. The computerized device of claim 9 wherein the controller is further configured to receive an unsubscribe message from the associated content subscriber in response to transmitting the notification message, the unsubscribe message indicating unsubscription from a one-to-one transmission channel for reception of the presence information and subscription to the one-to-many transmission channel for reception of the presence information.

14. The computerized device of claim 9 wherein the controller is configured to:
  when inserting, insert the address within a notification message in response to receiving the subscription request, the address relating to presence information transmitted using a multicast transmission channel; and
  when transmitting, transmit the notification message to the associated content subscriber, the address of the notification message allowing the content subscriber to subscribe to the presence information using the multicast transmission channel.

15. The computerized device of claim 9 wherein each address within the notification message includes a tag indicating a particular communications protocol and wherein the content subscriber is configured to communicate according to the communications protocol identified by said tag such that multiple protocols are utilizable by a plurality of independently-implemented content subscribers.

16. A computer program product having a computer-readable medium including computer program logic encoded thereon that, when performed on a controller in a system having a coupling to at least one communications interface provides a method for allowing a content subscriber to access presence information by performing, by the computer program product, the operations of:
  receiving on a one-to-one transmission channel from the content subscriber, a subscription request for the presence information;
  inserting an address and an address identifier within a notification message in response to receiving the subscription request, the address within the notification message directing the content subscriber to a one-to-many transmission channel to receive the presence information transmitted using the one-to-many transmission channel, and the address identifier within the notification message indicating an availability of the address within the notification message;
  transmitting the notification message to the content subscriber using the one-to-one transmission channel, the address of the notification message allowing the content subscriber to subscribe to the presence information using the one-to-many transmission channel based on the content subscriber recognizing the address idendtifier; and,
  in accordance with a recognizing of the address identifier within the notification message by the content subscriber, subscribing to a delivery of the presence information using the one-to-many transmission channel resulting in the content subscriber receiving the presence information by the one-to-many transmission channel.

17. A system for distributing presence information from a presence server to a content subscriber, the system comprising:
  means for receiving, from the content subscriber on a one-to-one transmission channel, a subscription request for the presence information;
  means for inserting an address and an address identifier within a notification message in response to receiving the subscription request, the address within the notification message directing the content subscriber to a one-to-many transmission channel to receive the presence information transmitted using a one-to-many transmission channel and the address identifier indicating an availability of the address within the notification message;
  means for transmitting the notification message to the content subscriber using the one-to-one transmission channel, the address of the notification message allowing the content subscriber to subscribe to the presence information using the one-to-many transmission channel;
  means for recognizing, by the content subscriber, the address identifier; and
  means for subscribing to a delivery of the presence information using the one-to-many transmission channel in accordance with the content subscriber recognizing the address idendtifier within the notification message resulting in the content subscriber receiving the presence information from the presence server by the one-to-many transmission channel.

18. In a content subscriber, a method for accessing presence information comprising:
  transmitting a first subscription request for presence information to an associated computerized device;
  receiving, in response to transmitting the subscription request, a notification message from the associated computerized device, the notification message including an address directing the content subscriber to a one-to-many transmission channel to receive the presence information transmitted using the one-to-many transmission channel, and the notification message including an address identifier indicating the availability of the address within the notification message;

determining a recognizing of the address identifier within the notification message; and based on the recognizing of the address identifier in the notification message, transmitting a second subscription request for the presence information using the one-to-many transmission channel wherein transmission of the second subscription request results in receiving the presence information from the associated computerized device by the one-to-many transmission channel.

19. The method of claim 18 further comprising:

examining the address identifier; and disregarding the address based on a non-recognizing of the address identifier, wherein the presence information is received from the associated computerized device by the one-to-many transmission channel.

20. The method of claim 18 further comprising transmitting an unsubscribe message to the presence server in response to receiving the notification message, the unsubscribe message indicating unsubscription from a one-to-one transmission channel for reception of the presence information and subscription to the one-to-many transmission channel for reception of the presence information.

21. The method of claim 18 wherein the step of receiving comprises receiving a notification message from the computerized device, the notification message having a plurality of addresses, each of the plurality of addresses relating to the presence information transmitted using a corresponding one-to-many transmission channel and further comprising selecting a one-to-many transmission channel for reception of the presence information.

22. The method of claim 18 wherein:

the receiving comprises receiving, in response to transmitting the subscription request, a notification message from the computerized device, the notification message having an address relating to the presence information transmitted using a multicast transmission channel; and the transmitting a second subscription request comprises transmitting the second subscription request for presence information using the multicast transmission channel.

23. A content subscriber comprising:

at least one communications interface;

a controller; and an interconnection mechanism coupling the at least one communications interface and the controller;

wherein controller is configured to:

transmit, via the at least one communications interface, a first subscription request for presence information to an associated computerized device;

receive, via the at least one communications interface, in response to transmitting the subscription request, a notification message from the associated computerized device, the notification message having an address directing the content subscriber to a one-to-many transmission channel to receive the presence information transmitted using the one-to-many transmission channel, and the notification message having an address idendtifier indicating the availability of the address within the notification message;

determine a recognition of the address identifier; and in accordance with determining the recognition of the address identifier in the notification message, transmit, via the at least one communications interface, a second subscription request for the presence information using the one-to-many transmission channel;

wherein transmission of the second subscription request results in receiving the presence information from the associated computerized device by the one-to-many transmission channel.

24. The content subscriber of claim 23 wherein the controller; further configured to:

examine the address identifier; and disregard the address in accordance with determining a non-recognition of the address identifier, wherein transmission of a subscription request results in receiving the presence information from the associated computerized device by the one-to-one channel.

25. The content subscriber of claim 23 wherein the controller, when receiving, is configured to receive, via the at least one communications interface, a notification message from the first computerized device, each of the plurality of addresses relating to the presence information transmitted using a corresponding one-to-many transmission channel and wherein the controller is further configured to select a one-to-many transmission channel for reception of the presence information.

26. The content subscriber of claim 23 wherein the controller is further configured to transmit an unsubscribe message to the presence server in response to receiving the notification message, the unsubscribe message indicating unsubscription from a one-to-one transmission channel for reception of the presence information and subscription to the one-to-many transmission channel for reception of the presence information.

27. The content subscriber of claim 23 wherein the controller:

when receiving, is configured to receive, in response to transmitting the subscription request, a notification message from the computerized device, the notification message having an address relating to presence information transmitted using a multicast transmission channel; and when transmitting, is configured to transmit a second subscription request for presence information using the multicast transmission channel.

28. A computer program product having a computer-readable medium including computer program logic encoded thereon that, when performed on a controller having a coupling to at least one communications interface provides a method for performing the operations of:

transmitting a first subscription request for presence information to an associated computerized device;

receiving, in response to transmitting the subscription request, a notification message from the associated computerized device, the notification message having an address directing a content subscriber to a one-to-many transmission channel to receive presence information transmitted using the one-to-many transmission channel, and the notification message having an address identifier indicating an availability of the address within the notification message;

determining a recognizing of the address identifier; and transmitting a second subscription request for the presence information using the one-to-many transmission channel in accordance with a recognizing of the address identifier within the notification message, wherein transmission of the second subscription request results in receiving the presence information from the associated computerized device by the one-to-many transmission channel.

29. A content subscriber comprising:

at least one communications interface;

a controller; and an interconnection mechanism coupling the at least one communications interface and the controller;

wherein the controller includes:

means for transmitting, via the at least one communications interface, a first subscription request for presence information to an associated computerized device configured to produce a means for accessing presence information;

means for receiving, via the at least one communications interface and in response to transmitting the subscription request, a notification message from the associated computerized device, the notification message having an address directing the content subscriber to a one-to-many transmission channel to receive the presence information transmitted by the associated computerized device using the one-to-many transmission channel, and the notification message having an address identifier indicating an availability of the address within the notification message;

means for identifying the address identifier as an identified address; and means for transmitting, via the at least one communications interface, a second subscription request for the presence information using the one-to-many transmission channel in accordance with the address in the notification message being identified as an identified address, wherein transmission of the second subscription request results in receiving the presence information from the associated computerized device by the one-to-many transmission channel.

\* \* \* \* \*